United States Patent [19]

McKay et al.

[11] 3,948,142

[45] Apr. 6, 1976

[54] ONE-PIECE BLIND NUT ASSEMBLY

[75] Inventors: Thomas L. McKay, Los Angeles; James K. Blair, Canoga Park; Harold R. Howard, Inglewood, all of Calif.

[73] Assignee: Corlok Corporation, Canoga Park, Calif.

[22] Filed: Sept. 9, 1974

[21] Appl. No.: 504,507

[52] U.S. Cl. .............................. 85/70; 151/41.72
[51] Int. Cl.² .................... F16B 13/06; F16B 29/00
[58] Field of Search ..... 85/70, 71; 151/41.72, 41.73

[56] References Cited
UNITED STATES PATENTS

| 2,255,650 | 9/1941 | Burke | 85/71 X |
|---|---|---|---|
| 2,324,142 | 7/1943 | Eklund | 85/70 X |
| 3,174,387 | 3/1965 | Fischer | 85/71 |
| 3,215,026 | 11/1965 | Davis | 85/70 |
| 3,236,143 | 2/1966 | Wing | 85/70 |
| 3,657,955 | 4/1972 | McKay | 85/70 |

FOREIGN PATENTS OR APPLICATIONS

| 878,521 | 10/1942 | France | 85/70 |
|---|---|---|---|
| 1,205,744 | 9/1970 | United Kingdom | 85/70 |

*Primary Examiner*—Ramon S. Britts
*Attorney, Agent, or Firm*—George F. Smyth

[57] ABSTRACT

A one-piece blind nut, usable for flush attachment to a workpiece by axially collapsing the nut through the use of a mandrel and an anvil, includes a body member with an internally threaded end portion which receives the threaded end portion of the mandrel. An aperture of predetermined diameter is provided in the workpiece, and the blind nut, assembled to the mandrel, is inserted through the aperture. The end of the nut opposite the threaded portion includes a serrated exterior portion which is used to secure the blind nut to the workpiece in a non-rotating relationship without the use of a countersink in the workpiece.

17 Claims, 14 Drawing Figures

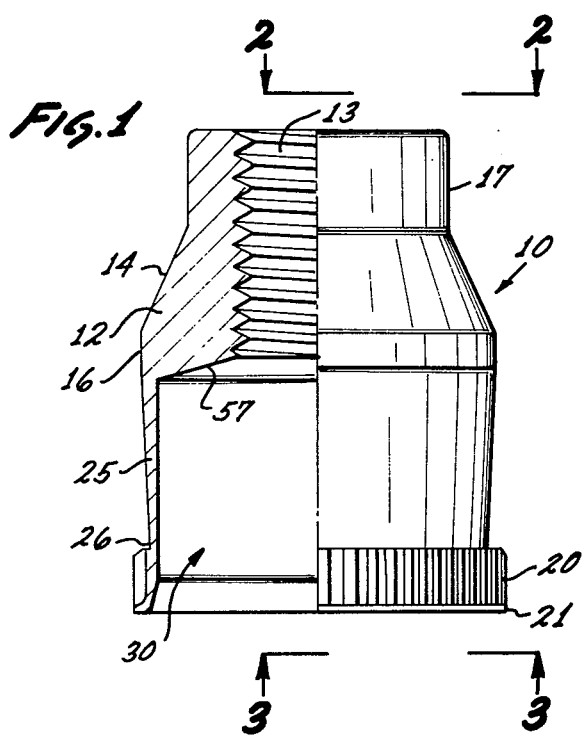
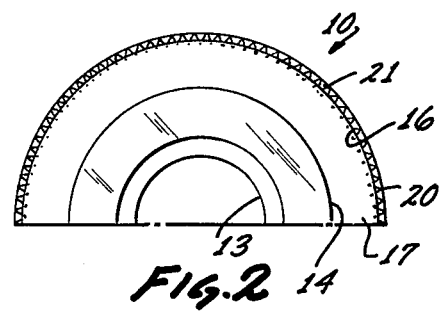
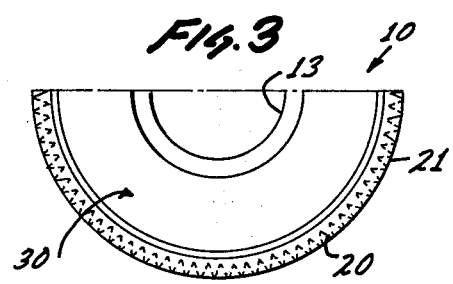
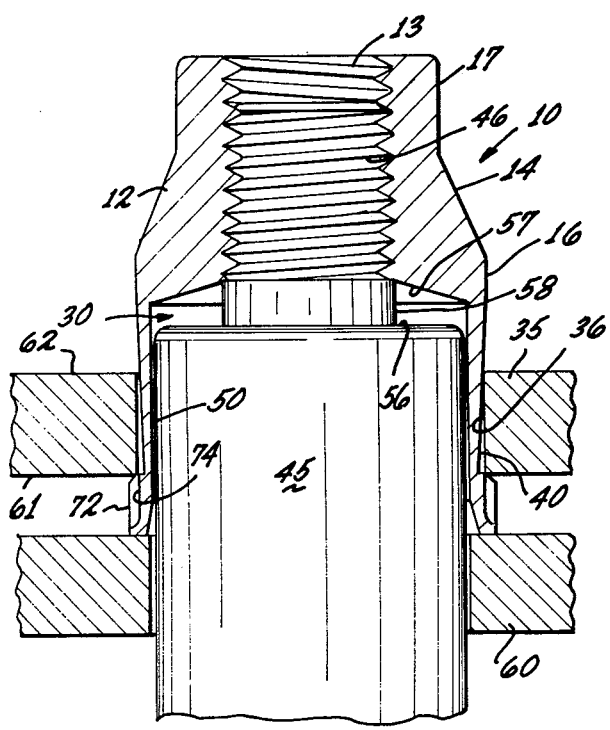
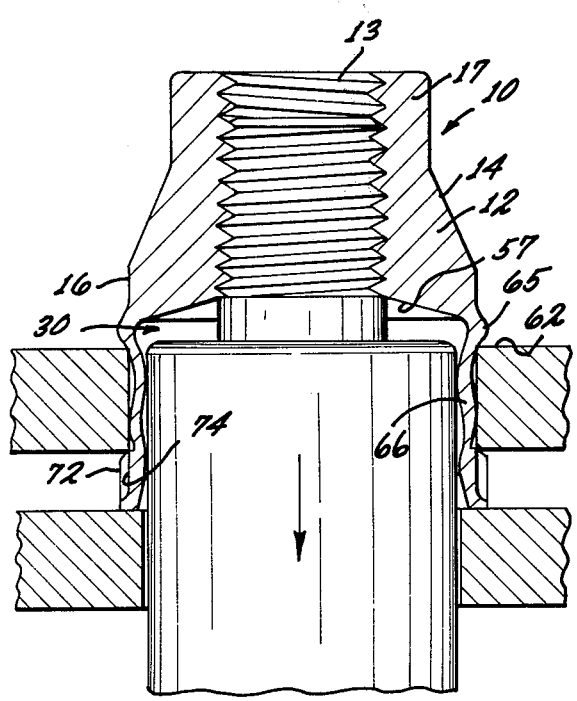

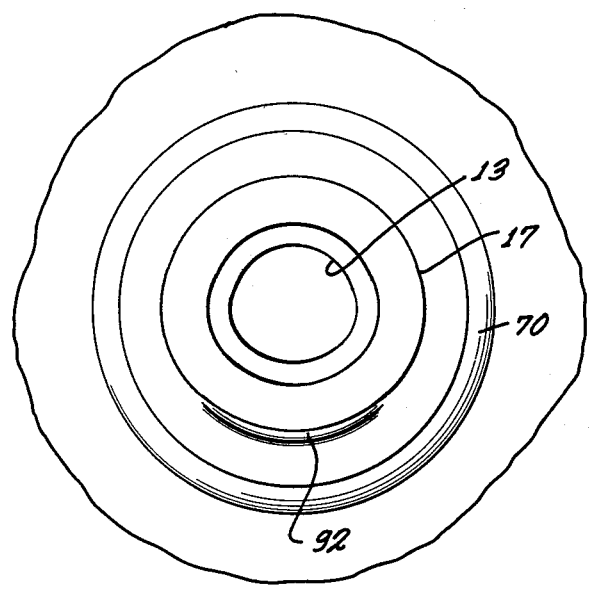
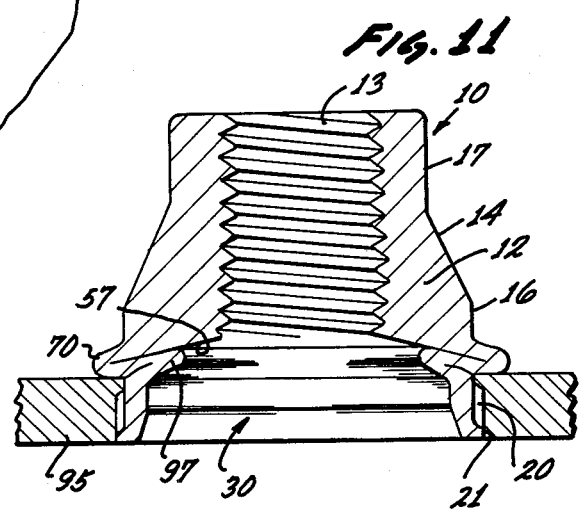
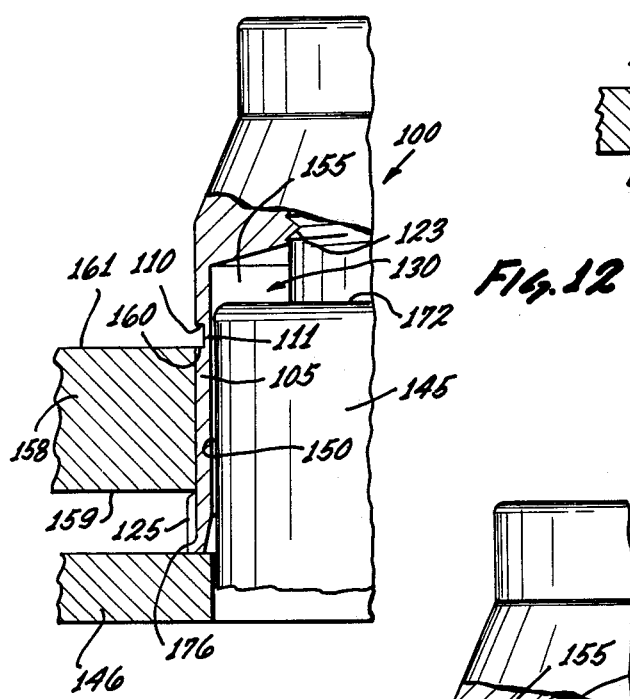
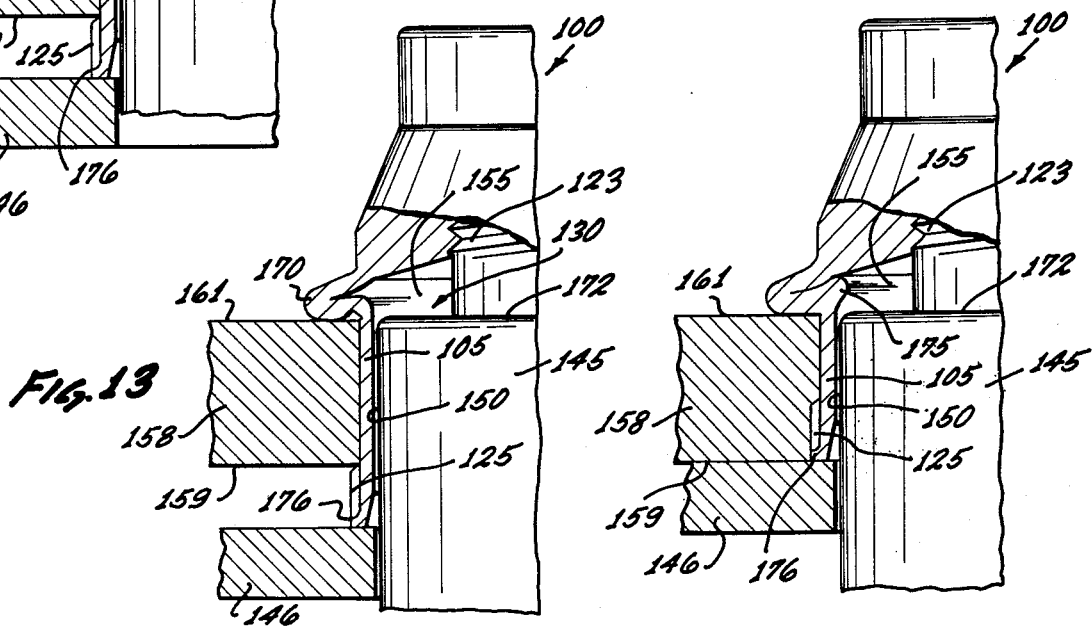

ONE-PIECE BLIND NUT ASSEMBLY

BACKGROUND OF THE INVENTION

This invention relates to a one-piece blind nut, and more particularly, to an improved one-piece blind nut for flush attachment to a workpiece wherein the blind nut includes a clearance chamber which receives the metal which flows during the installation of the nut to the workpiece.

Fasteners of the class commonly known as "blind fasteners" or blind nuts are known and are utilized to assemble various elements together, the term "blind fastener" generally being used to describe a fastener which can be assembled from one side of the work. Typical of the uses of the blind fasteners or blind nuts are attachment of cover plates, name plates, decorative panels, skin panels, and the like.

In general, these blind fasteners or blind nuts are collapsed to secure them to the workpiece, and optimally, once installed, the blind nut does not rotate with respect to the workpiece.

In many applications, it is desired that the blind nut be installed flush with respect to the workpiece. In some blind nuts of the prior art, it has been necessary to provide an aperture in the workpiece which must be provided with a countersink for installation of the blind nut. The countersinking operation is a second operation and therefore increases the time and expense incident to the use of blind nuts which require countersinking of the work piece in order for their use.

Typical of the prior art blind fasteners are those described in U.S. Pat. Nos. 2,324,142; 3,136,203; 3,236,143; 3,322,449; 3,369,442; and 3,657,955.

While the above-identified structures operate satisfactorily, in some instances there is objection because of the need to provide a countersunk aperture in the workpiece, or, in the alternative, the expense in manufacturing the blind nut is a serious consideration. For example, any blind nut structure that is composed of multiple pieces requires an assembly operation during their manufacture which has the effect of increasing the unit cost of each such blind nut.

In addition to blind nuts of the types illustrated in the above patent, there is commercially available a blind nut formed of a single piece construction, the blind nut having a generally cylindrical bore which terminates at one end in a tapered section, the external configuration of the blind nut being such that it includes a narrow band at one end which is serrated. There is a groove near the serrated end and adjacent to the groove is an enlarged section which is received within the aperture in the workpiece. The portion of the bore between the enlarged section which is received in the aperture and the threaded end is of a tapered configuration such that as the nut is collapsed through the use of anvil and a mandrel, metal flows radially outwardly to form a locking key. The objection to the above type of blind nut is the fact that the preparation of the aperture requires a countersinking operation which adds to the cost of installation during use of the nut.

Accordingly, it becomes apparent that there are advantages from a cost standpoint of being able to provide a blind nut fastening type device which is of a one piece structure. The reduction in manufacturing costs results in a reduction in the unit cost of the nut. Moreover, the provision of a fastener which is of a single piece structure and which may be received within an aperture which does not include a countersunk portion is quite desirable. The advantages of such a structure are the savings in the cost of the manufacture and the savings in the cost of installation, each a practical advantage of some significance.

It would also be of advantage to provide a blind fastener type of structure in which the fastener may be used with workpieces of different cross-sectional dimensions, that is, one nut which may be used with a series of workpieces which vary in cross-sectional dimension over a range.

SUMMARY OF THE PRESENT INVENTION

By the present invention, a one-piece blind nut is provided which overcomes the problems of the prior art devices whch are of two pieces or those of a single piece structure which require a countersunk aperture in the workpiece, or those which are limited in the sense that the nut is structured in such a way that it can only be used with workpieces of a predetermined cross-sectional dimension. Thus, the blind nut of the present invention is a one-piece structure of steel, stainless steel or aluminum alloys and includes a body member having an internally threaded portion at one end thereof. The other end of the body member includes a serrated exterior end portion which is utilized to secure the nut in a nonrotating relationship with respect to the workpiece.

The body member includes a deformable wall portion which extends between the serrated end portion and the threaded portion, the body member including a cavity which is defined by the deformable wall portion, the cavity having a diameter greater than the diameter of the threaded portion.

The external diameter of the body member in the portion which forms the deformable wall is of a dimension correlated and coordinated to be received within the aperture in the workpiece such that a small clearance is formed between the opposed walls of the nut and the aperture in the workpiece. The diameter of the cavity and its length are likewise coordinated and correlated to provide a clearance chamber into which metal of the deformable wall may flow during the installation of the blind nut.

As will be appreciated, the blind nut of the present invention is installed by the use of an anvil and a mandrel, the mandrel being threaded at one end and received within the internally threaded section of the blind nut. As the mandrel and anvil are moved relative to each other in an axial direction and the nut is collapsed to form a locking ring which engages the back wall of the workpiece to lock the blind nut into position. As the mandrel and anvil are continued to be advanced towards each other, the serrated end of the blind nut is forced into the workpiece to anchor the same in a nonrotating, relative position with respect to the workpiece.

The provision of the clearance space offers the advantage of providing an area into which metal may flow during the collapsing of the nut, the thinner the workpiece being used with the blind nut the more metal is pushed or flowed into the clearance chamber. Thus, a blind nut of a predetermined dimension may be used with a relatively thick piece or a piece which is somewhat thinner, the thinner piece resulting in the flow of greater material of the nut into the clearance chamber.

Because of the manner of assembly of the blind nut, no countersinking of the aperture is necessary, and the serrations are operative to provide a nonrotating anchoring of the blind nut with respect to the workpiece.

One of the additional advantages of the nut of the present structure is the fact that the serrations do not extend all the way to the end of the nut but are formed with an end ridge or land which functions to prevent the nut from being pushed through the workpiece in the event that a workpiece of relatively thin cross-section is utilized.

Since the nut is of a single-piece structure, it offers the advantage of reduced manufacturing cost over blind nuts of two-piece structure, while the provision of a clearance space provides some versatility with respect to the cross-sectional dimension of workpieces which can be used with a nut of any predetermined dimensions. This is in contrast to some of the single-piece blind nuts of the prior art and those which are commercially available and which include a relatively thick wall which is received within the aperture, the axial dimension of the thick wall fairly defining the cross-sectional dimension of the workpiece with which the blind nut may be used.

The blind nut constructed in accordance with the present invention may take any one of several different configurations, as described, each intended to achieve the advantages which have already been pointed out. For example. in one form the blind nut includes a tapered deformable wall whose thinnest cross-section is adjacent to the serrated end and spaced from the internally threaded end. In another form, usable with workpieces of relatively thick cross-section, an external groove is provided axially spaced from the serrated end to define the portion of the wall of the nut which starts to collapse during assembly of the nut to the workpiece. Even in this modified form of structure, a clearance chamber is provided into which metal of the nut is flowed during its assembly to a workpiece.

As a result of the simplified structure of the blind nut type of fastener of the present invention, and the simplicity of assembly to the workpiece, as well as the variety of cross-sectional dimensions with which a particular size blind nut may be used, several advantages are provided over the prior art devices. The relative reduction in the cost of manufacture renders the blind nut of the present invention attractive from a cost standpoint in fields such as the refrigeration field and the commercial field. By way of example, the tensile characteristics of the blind nut of the present invention are as good as those described in U.S. Pat. No. 3,657,955, previously referred to.

The above and other features and advantages of the present invention will become more apparent from the detailed description of the preferred embodiments such as those illustrated and described in connection with the accompanying drawings.

DESCRIPTION OF THE DRAWINGS

FIG. 1 is a view partly in section and partly in elevation of a blind nut in accordance with the present invention;

FIG. 2 is a view taken along the lines 2—2 of FIG. 1;

FIG. 3 is a view taken along the lines 3—3 of FIG. 1;

FIG. 4 is a view partly in section with the mandrel in elevation illustrating the first step in assembling the nut of the present invention to a workpiece;

FIG. 5 is a view similar to FIG. 4 but illustrating the relative position of the parts as the mandrel and anvil are moved relative to each other;

FIG. 10 is a view taken along the lines 10—10 of FIG. 9 illustrating an additional optional installation of crimping the end of the fastener of this invention;

FIG. 11 is a view in section showing the assembly of a blind nut in accordance with the present invention with a workpiece which is thinner than that illustrated in FIGS. 4–9;

FIG. 12 is a view of a modified form of blind nut in accordance with the present invention usable with a workpiece having a cross-sectional dimension thicker than that illustrated in FIGS. 4–9;

FIG. 13 is a view similar to FIG. 12 indicating the formation of the locking ring in accordance with the present invention; and FIG. 14 is a view similar to FIG. 13 showing the flow of metal into the annular clearance in accordance with the present invention.

DESCRIPTION OF THE PREFERRED EMBODIMENT

Figure 6:
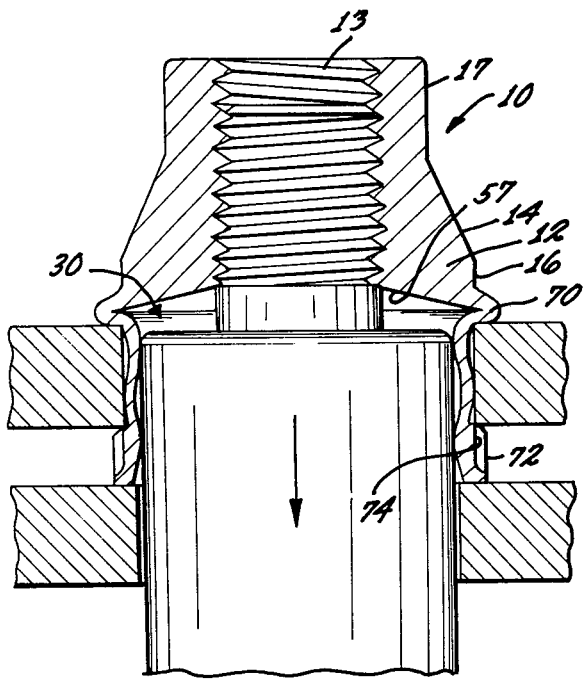
FIG. 6 is a view similar to FIG. 5 but illustrating the formation of the locking ring around the inside surface of the workpiece in accordance with the present invention.

Referring to FIGS. 1–3, a preferred form of a blind nut 10 in accordance with the present invention is shown as including a body member 12 having an internally threaded portion 13 at one end thereof. The portion of the body member which is internally threaded is tapered as indicated at 14 from a portion of a major diameter indicated at approximately 16 to a smaller diameter end portion 17. The nut may be formed of any appropriate metal or alloy such as aluminum, stainless steel or steel.

The end 20 of the blind nut opposite the internally threaded end 13 is serrated or knurled, as illustrated, the serrated exterior end being operative to secure the nut in a non-rotating relationship with respect to a workpiece to which it is assembled. As illustrated, the serrations do not extend to the end of the nut, but terminate short of the end in a continuous land 21 which is operative to engage the front side of the workpiece to prevent the blind nut from being urged through the workpiece in those instances in which a relatively thin workpiece is utilized.

The body member 12 includes a deformable wall 25 which extends between the internally threaded section 13 and the serrated section 20. As illustrated in FIG. 1, a portion of the wall is cylindrical, that is, portion 16, while the remainder of the wall between the annular band 16 and the serrated portion is tapered, as indicated, such that the narrowest portion of the taper 26 and the thinnest cross-section of the wall is immediately adjacent to the serrations 20.

Internally of the body member is a cavity generally designated 30, the cavity being defined by the deformable wall portion 25, the cavity having a diameter which is greater than the diameter of the internally threaded portion 13.

In the use of the blind nut in accordance with the present invention, an aperture is formed in the workpiece, the aperture being of a predetermined size with respect to the diameter of the blind nut as measured along the cylindrical section 16.

Referring to FIG. 4, a workpiece 35 is illustrated with an aperture 36 therein, the diameter of the body portion of the blind nut, and especially that portion forming the deformable wall 25 being coordinated and correlated to be received within the workpiece 35 such that a small clearance 40 is formed between the opposed deformable wall of the blind nut and the wall of the aperture 36 formed in the workpiece.

To effect locking of the blind nut to the workpiece, a mandrel 45 is provided, the mandrel including a threaded end 46 which is received within the internally threaded end 13 of the blind nut. As will be apparent from an examination of FIG. 4, the diameter of the cavity 30 and its length are coordinated and correlated with the diameter and length of the mandrel such that a clearance 50 is provided between the outer surface of the mandrel and the inner surface of the cavity wall, as indicated, while also providing an annular clearance chamber generally designated 55 which is to the rear and radially outwardly of the threaded portion of the nut. The clearance is formed between the forward face 56 of the mandrel and that portion of the cavity immediately to the rear of the tapered wall 57 which forms the base of the cavity.

The installation procedure of the blind nut of the present invention is accomplished by threading the blind nut onto the forward end of the mandrel until the grip portion 58 contacts the threaded end of the nut 13, fragmentarily shown in FIG. 4. The anvil 60 may be contacted but usually would not. Thereafter, the mandrel with the nut assembled thereto is inserted from the front side 61 of the workpiece through the aperture to the relative position illustrated in FIG. 4.

The anvil 60 engages the end of the nut adjacent the serrated portion thereof. Cooperating with the mandrel is a chuck, of conventional design and not shown, the manipulation of which is operative to effect axial, nonrotating movement of the mandrel with respect to the anvil, the mandrel being moved in the direction of the arrow as illustrated in FIG. 5. As the chuck is actuated to move the mandrel axially in the direction indicated in FIG. 5, a portion of the deformable wall forward of the inside surface 62 of the workpiece 60 begins to collapse as illustrated. Due to the presence of the mandrel, a bulge 65 is formed in a radial direction on the inner face of the workpiece, and with continued movement of the mandrel axially in the direction indicated, the nut slowly begins to engage the workpiece. Ultimately, the deformed portion 65 will form a locking ring on the back side 62 of the workpiece.

It will be noted that a portion of the deformable wall generally indicated 66, and defined by that portion of the wall which is opposite the aperture in the workpiece and the opposed facing wall of the mandrel tends to flow or deform slightly. Since this annular band of metal is confined between the opposed surfaces of the aperture in the workpiece and the mandrel, it cannot bulge inwardly, but is caused to move in a general axial direction towards the rear face 62 of the workpiece, assisting in formation of the annular bulge 65 which ultimately forms the locking ring which secures the blind nut 10 to the workpiece.

Referring to FIG. 6, the relative position of the parts is illustrated in which the mandrel has been withdrawn axially in amount sufficient to complete formation of the locking ring 70. In the relative position of the parts illustrated in FIG. 6, the serrated end 20 has just started to enter the workpiece, and in this relative position of the parts, the blind nut is only partly affixed to the workpiece 35.

Figure 7:
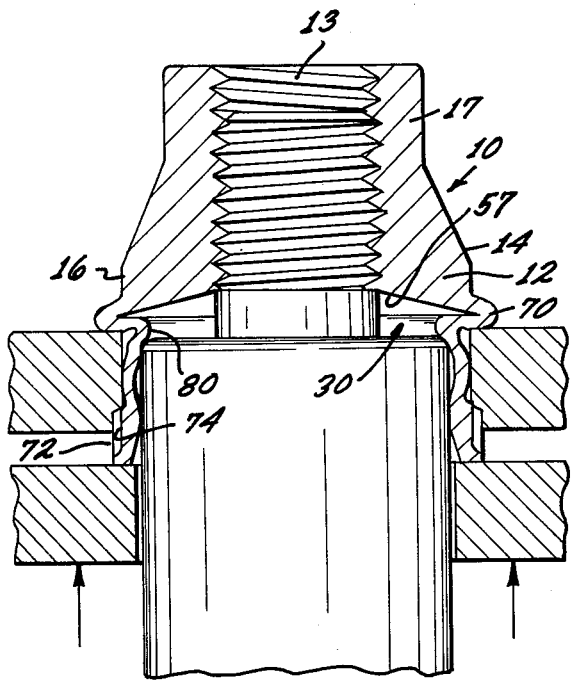
FIG. 7 is similar to FIG. 6 but illustrating the formation and flow of additional material to the clearance space in accordance with this invention.

Referring to FIG. 7, as the locking ring 70 is formed, movement of the portion of the blind nut on the backside 62 of the workpiece no longer takes place due to the formation of the locking ring 70, and continued axial movement of the mandrel relative to the anvil is effective to initiate movement of the serrated end portion into the workpiece through the front surface thereof. In order to provide a nonrotating locking relationship between the blind nut and the workpiece, serrated end portion includes axially extending crests 72 and valleys 74, the diameter of the crests being greater than the diameter of the body member and greater than the aperture into which the blind nut is assembled. The valleys 74, on the other hand, are slightly smaller in diameter than the diameter of the aperture in the workpiece. Thus, as the serrated end is forced axially into the workpiece by movement of the anvil relative to the mandrel, the crests of the serrations initially cut into the metal, and any metal which is skived is pushed into the clearance between the mandrel and the aperture, while any material displaced radially fills the valleys between adjacent crests of the serrations.

As the serrated end portion of the nut is advanced into the workpiece, the axial distance between the end of the nut and the locking ring is gradually decreased causing a flow of metal generally indicated 80 into the annular clearance 55 provided between the front face of the mandrel and the base of the cavity 30 formed in the nut 10. The presence of this annular clearance is operative to provide a space into which metal may flow, after the formation of the locking ring and during the final stages of locking the blind nut to the workpiece.

As indicated in FIG. 7, the deformable wall portion which is disposed between the workpiece and the anvil is somewhat deformed, and continued axial movement of the serrated end towards the threaded end of the blind nut, as accomplished by the relative axial movement of the mandrel and the anvil, causes the flow of metal which forms the bead 80 which now projects radially inwardly, as illustrated.

Figure 8:
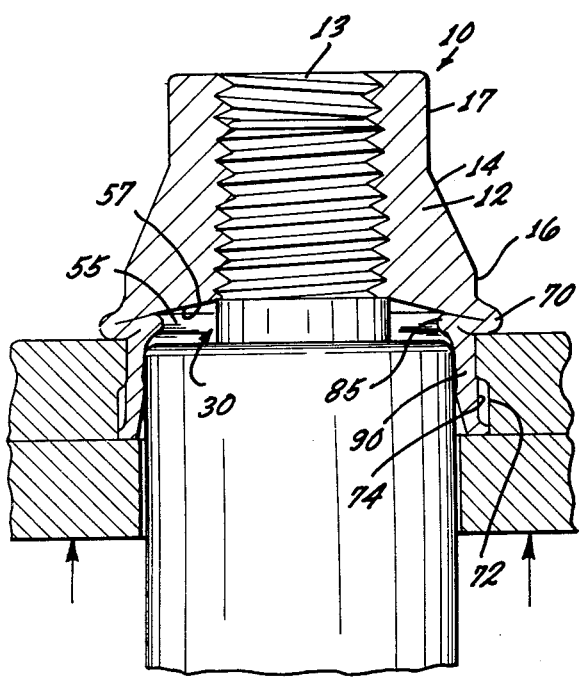
FIG. 8 is a view similar to FIG. 7 illustrating the relative position of the parts upon completion of the installation procedure of the blind fastener in accordance with the present invention.

Referring to FIG. 8, the serrated end of the blind nut has been urged completely into the workpiece and the anvil 60 now bears against the front face of the workpiece, as illustrated. By comparison of FIGS. 7 and 8, it will be seen that the axial distance between the locking ring 70 and the end of the blind nut at the serrated end portion thereof has been decreased in FIG. 8 over the corresponding dimension of FIG. 7. Due to the decrease in this axial dimension, more metal is caused to flow into the clearance chamber 55 with the resulting formation of a double fold indicated as 85 and 70, 85 representing the completed radially inwardly fold formed during the final locking movement of the blind nut of the present invention into the workpiece. In the course of the movement of the blind nut into the workpiece and especially that portion of the operation involving advancing the serrated end into the workpiece, there is some slight increase in the cross-sectional dimension of the wall portion generally indicated at 90 as a result of shortening the overall axial dimension of the nut during the assembly procedure. In addition, there is some flow of metal, as indicated, to form the internal fold indicated at 85 in FIG. 8. In this relative position of the parts, the assembly of the nut has been completed, and the blind nut is now anchored to the workpiece by virtue of the serrations which prevent rotation, and the locking ring 70 formed on the inside surface of the workpiece.

Figure 9:
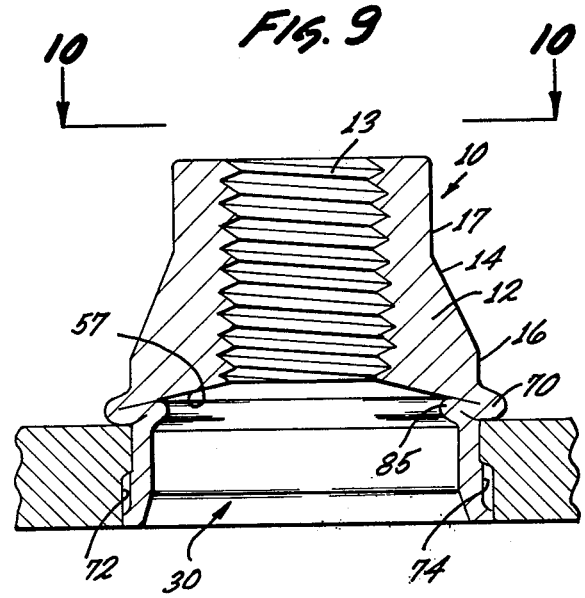
FIG. 9 is a view similar to FIG. 8 illustrating the completed assembly and withdrawal of the mandrel and anvil in accordance with the present invention.

Thereafter, the mandrel and anvil are removed, and the assembly of the blind nut to the workpiece is completed, as illustrated in FIG. 9.

From a comparison of FIGS. 4 through 9, it will be apparent that the use of a tapered wall having its thinnest portion adjacent to the serrated end offers the advantage of promoting the formation of the locking ring 70 on the inside face of the workpiece, the mandrel being operative to prevent the formation of any folds within the annular clearance between the opposed walls of the mandrel and the wall of the aperture. The bulge 65 should start at or very near the edge of the back side 62 of the workpiece. Therefore, it is necessary, when trying to accommodate a large range of material thicknesses, to have a tapered wall so the bulge will start at the thinnest point not restrained, i.e. just at the edge of 62. The continued axial movement of the mandrel relative to the anvil with a resulting reduction in the axial dimension between the end of the serrated end portion and the forming locking ring creates no major problem since a clearance space has been provided into which excess metal may flow without adversely affecting the locking sequence. If it were not for this clearance space, the serrations would not draw flush. Throughout the entire assembly procedure, the nut has not been rotated, it has merely been moved axially and collapsed axially in order to achieve the non-rotating locking relationship such that the nut cannot rotate within the workpiece nor can it move axially of the workpiece.

In order to provide for locking of any bolt which may be assembled into the blind nut, the end 17 of the blind nut may be crimped as indicated in FIG. 10 at 92 in order to collapse the side wall of the nut such that the threads of the bolt are securely anchored into the nut. It is for this purpose that the end of the nut adjacent to the internally threaded portion is of reduced cross-sectional dimension as indicated. It also reduces the weight of the nut and makes it easier to start into the hole.

As previously mentioned, the blind nut of the present invention offers the advantage that it may be used with materials having different cross-sectional dimensions. Referring to FIG. 11, an assembled blind nut is illustrated in which the workpiece 95 is thinner than the workpiece described in connection with FIGS. 4–9. Since it is necessary, with a thinner cross-sectional workpiece material for the serrated end to move a distance axially greater than with a thicker cross-section, a greater flow of metal occurs as illustrated at 97 in which the radially inwardly projecting fold extends radially inwardly a dimension greater than illustrated in FIG. 9. It is for this reason that the provision of a clearance space 55, as described is of a distinct advantage since the clearance space provides an ample volume into which metal of the nut may flow during the assembly procedure.

FIG. 11 also illustrates the function of the land 21 which cooperates with the serrated end 20, the land functioning to prevent movement of the serrated end of the nut through the aperture of the workpiece. Accordingly, by spacing the ends of the serrations somewhat axially from the end of the blind nut, assurance is provided that the blind nut will not inadvertently be pushed into and through the aperture formed in the workpiece.

It will also be apparent from examination of FIGS. 9 and 11 that the assembled blind nut fits flush with the front face of the workpiece, and any improper or erroneous installation is easily determined by visually examining the front face of the workpiece.

Where the blind nut embodying the features of the present invention is to be used with a relatively thick workpiece, the essential features previously described may be embodied in the structure, and reference is made to FIG. 12 which illustrates a modified form of blind nut 100 in accordance with the present invention.

In the form illustrated in FIG. 12, the wall 105 of the nut 100 includes a groove 110 formed in the outer periphery thereof to define a wall section 111 of reduced cross-section. The deformable wall 105 extends between the internally threaded section 123 and a serrated end section 125, the body of the nut 100 including a cavity generally designated 130.

As with the structures previously described, the blind nut 100 is installed by the use of a mandrel 145 and an anvil 146, the diameter of the cavity 130 and its length being coordinated and correlated with the diameter and the length of the mandrel 145 such that a clearance 150 is provided between the outer surface of the mandrel and the inner surface of the cavity wall, as indicated, while also providing an annular clearance chamber 155 which is to the rear and radially outwardly of the threaded portion of the nut.

As illustrated in FIG. 12, the workpiece 158 is considerably thicker than the workpiece illustrated in FIGS. 4–9, and for this reason, the groove 110 is provided in the side wall of the nut 100. The groove is located axially from the serrated end 125 of the nut such that with the serrations 125 bearing against the front face 159 of the workpiece, one side wall 160 of the groove 110 is aligned with the rear face 161 of the workpiece. The assembly of the nut 100 in locking relationship to the workpiece 158 is accomplished as described previously.

Referring to FIG. 13, the mandrel and the anvil are moved axially relative to each other resulting in the formation of a locking ring 170 which extends radially outwardly from the nut and which is formed in that portion of the wall which is forward of the side wall 160 of the groove 110. Since the mandrel remains on the inside of the cavity 130 in that relative position such that the front face 172 of the mandrel is forward of the groove, the collapsing of the side wall of the nut forces the locking ring 170 to form on the outside periphery rather than being folded inwardly.

As illustrated in FIG. 13, the fold location is controlled by the position of the groove 110 axially along the wall of the nut, and in this particular form of the invention, the axial position of the groove is coordinated and correlated with the cross-sectional dimension of the workpiece with which the nut is to be used such that the groove is located in the proper position to initiate the formation of the locking ring 170 on the rear face 161 of the workpiece 158.

In the relative position of the parts illustrated in FIG. 13, the serrated end 125 of the nut 100 has not yet entered the workpiece, and the nut is partially locked to the workpiece by formation of the locking ring 170.

As the anvil and mandrel are moved further in an axial direction relative to each other, the serrated portion 125 of the nut enters the workpiece, as illustrated in FIG. 14 with the resulting formation of a radially inwardly directed fold 175, the fold being formed by the excess metal in the side wall of the nut which is moved and flowed into the clearance chamber 155 as the axial dimension between the serrated end of the nut and the locking ring 170 is reduced by advancing the serrated end of the nut into the workpiece. In the relative position of the parts as illustrated in FIG. 14, the nut is securely fastened to the workpiece in a non-rotating relationship and is locked axially thereto by virtue of the locking ring cooperating with the serration end and the land 176 formed at the end of the nut, the land 176 functioning as described in connection with land 21. Upon removal of the mandrel 145 and the anvil 146, the blind nut is installed and ready to receive whatever elements are to be mounted thereto.

As already described, in the form of nut illustrated in FIGS. 12 through 14, the ridges and valleys of the serrations are proportioned such that the ridges are of a greater diameter than the diameter of the wall of the nut 100 and somewhat greater than the diameter of the aperture into which the nut is to be received. Moreover, a simple straight hole and no countersinking is needed with the single piece nut illustrated in FIGS. 12–14.

As will be apparent from the foregoing description of preferred forms of the present invention, there are advantages to a one-piece nut which is relatively simple in structure and effective in providing a reliable blind fastener type of securing element. Thus, no countersinking of the aperture is required which simplifies the installation, and the improved structure herein described provides a reliable blind nut type of fastener which may be readily and easily assembled to provide a flush attachment to a workpiece.

It will be apparent that the above specific description and explanation of the illustrated forms of the invention are given by way of example, and various modifications and changes and substitutions may be made without departing from the practice of the invention as defined in the apended claims.

We claim:

1. A one-piece blind nut for flush attachment to a workpiece wherein the blind nut is attached to the workpiece by axially collapsing the nut by use of a mandrel received within the nut and by an anvil which bears against one end of the nut, said nut comprising:

a body member having an internally threaded portion at one end thereof for receipt of the mandrel, a serrated exterior end portion to secure the nut in nonrotating relation to the workpiece, said body member including a circumferentially continuous deformable wall portion extending between the serrated end portion and the threaded portion, means forming a cavity including a base in said body member bounded by said deformable wall portion and said cavity having an internal diameter greater than the diameter of said threaded portion, said deformable wall being spaced radially outwardly of said threaded portion by said base and forming an enlarged open end of said blind nut, said base extending radially inwardly between said deformable wall and said threaded portion and having a radial dimension between the deformable wall and the threaded portion greater than the cross-sectional dimension of the thickest portion of the wall portion between the serrated end portion and the threaded portion, the external diameter of said body member in the portion thereof forming the deformable wall being so coordinated and correlated to be received within a workpiece having an aperture therein of a predetermined diameter and said external diameter being greater than the external diameter of the major portion of the threaded end, the diameter of said cavity and the length thereof being so coordinated and correlated with the diameter and length of the mandrel to be threadably received in the threaded portion as to provide a clearance between the outer surface of said mandrel and the inner wall of said cavity while providing an annular clearance chamber to the rear and radially outwardly of the threaded portion of said nut, and said deformable wall being contiguous with said serrated end portion and having a cross-section at least equal to or less than the cross-section of the remaining portion of the wall between the serrated exterior and the threaded portion and said wall being operative to deform as the mandrel and anvil are moved axially to each other to form a radially outwardly extending fold and being operative as said serrated end enters the workpiece to flow into said clearance to form an inwardly projecting fold.

2. A one-piece blind nut as set forth in claim 1 wherein said serrated exterior end portion is spaced from said one end of said nut.

3. A one-piece blind nut as set forth in claim 1 wherein said serrated end portion includes axially extending crests and valleys, the diameter of said crests being greater than the diameter of said body member and greater than the aperture into which the blind nut is to be assembled.

4. A one-piece blind nut as set forth in claim 1 wherein said deformable wall is tapered in cross-section and the thinnest portion thereof is adjacent to said serrated end.

5. A blind nut for flush attachment to a workpiece wherein the blind nut is attached to the workpiece by use of a mandrel received within the nut and by an anvil which bears against one end of the nut, said nut comprising;

a body member having an internally threaded portion at one end thereof for receipt of the mandrel, means on an end portion and engageable in the material of the workpiece to secure the nut in nonrotating flush relation to the workpiece, said body member including a circumferentially continuous wall portion extending between the securing means and the threaded portion, means forming a cavity including a base in said body member, the external diameter of said body member in the portion thereof forming the wall being so coordinated and correlated to be received within a workpiece having an aperture therein of a predetermined diameter and said external diameter being greater than the external diameter of the major portion of the threaded end, the dimensions of said cavity being proportioned with respect to the dimensions of the mandrel to be received in the threaded portion as to provide an annular chamber at the base of said cavity, said deformable wall being spaced radially outwardly of said threaded portion by said base and forming an enlarged open end of said blind nut, said base extending radially inwardly between said deformable wall and said threaded portion and having a radial dimension between the deformable wall and the threaded portion greater than the cross-sectional dimension of the thickest portion of the wall portion between the means engageable with the workpiece and the threaded portion, said deformable wall between said securing means and said base being tapered and including a portion immediately adjacent the securing means which is thinner than the remaining portion of said wall and a portion adjacent to said base which is the thickest portion of said wall, and said wall being deformable against the face of said workpiece to form a locking ring as the mandrel and anvil are moved relative to each other and to flow axially to form a radially inwardly extending portion which flows into said chamber during installation of said nut.

6. A blind nut as set forth in claim 5 wherein the outer surface of said wall is tapered.

7. A blind nut as set forth in claim 5 wherein the cavity is of a diameter greater than the mandrel and is bounded by said deformable wall portion, the cross-section of said wall being proportioned to provide a clearance between the outer surface of the wall and the aperture, and said axial flow of the wall being in the clearance formed between the mandrel and the aperture in the workpiece.

8. A blind nut as set forth in claim 5 wherein said securing means is serrations made up of crests and valleys, the diameter of the crest portion being greater than the diameter of the aperture into which said nut is to be received.

9. A blind nut as set forth in claim 8 wherein said serrations are spaced axially inwardly from the end of the nut.

10. A blind nut as set forth in claim 5 wherein the diameter of the body at the portion thereof which is threaded is less than the diameter of the remainder of said body.

11. A blind nut as set forth in claim 5 wherein the nut is of one piece.

12. A blind nut as set forth in claim 5 wherein the nut is a one-piece metal nut.

13. A one-piece metallic blind nut for flush attachment to a workpiece wherein the blind nut is attached to the workpiece by collapsing the nut by use of a mandrel received within the nut and by an anvil which bears against one end of the nut, said nut comprising:

a body member having an internally threaded portion at one end thereof for receipt of the mandrel, serration means at one end of said nut to secure the nut in nonrotating relation to the workpiece, said body member including an imperforate continuous deformable wall portion extending between said serration means and the threaded portion, means forming a cavity including a base in said body member bounded by said deformable wall portion, the external diameter of said body member in the portion thereof forming the deformable wall being so coordinated and correlated to be received within a workpiece having an aperture therein of a predetermined diameter and said external diameter being greater than the diameter at the free end of the internally threaded portion thereof, said deformable wall being spaced radially outwardly of said threaded portion by said base and forming an enlarged open end of said nut, said base extending radially inwardly between said deformable wall and said threaded portion and having a radial dimension between the deformable wall and the threaded portion greater than the cross-sectional dimension of the thickest portion of the wall portion between the serration means and the threaded portion, the diameter of said cavity and the length thereof being so coordinated and correlated with the diameter and length of the mandrel to be threadably received in the threaded portion as to provide a clearance between the outer surface of said mandrel and the inner wall of said cavity while providing an annular clearance chamber to the rear and radially outwardly of the threaded portion of said nut, and said deformable wall immediately adjacent to said serration means having a cross-section at least equal to or less than the cross-section of the remaining portion of the wall between the serration means and the threaded portion and the said wall being operative to deform as the mandrel and the anvil are moved axially to each other to form a radially outwardly extending fold and operative as said serration means enters the workpiece to flow into said clearance to form an inwardly projecting fold.

14. A one-piece blind nut as set forth in claim 13 wherein said cross-section is uniform and said wall including an external groove so located axially on said nut that one wall therof is adjacent to the inside face of the workpiece.

15. A one-piece blind nut as set forth in claim 13 wherein said wall is tapered with the thinnest portion of said taper being immediately adjacent to said serration means.

16. A one-piece blind nut as set forth in claim 15 wherein the outer surface of said wall is tapered relative to the inner surface thereof.

17. A one-piece metallic blind nut for flush attachment to a workpiece wherein the blind nut is attached to the workpiece by axially collapsing the nut comprising:

a body member having an internally threaded portion at one end thereof the threaded end thereof including an outer tapered wall portion, serration means at one end of said nut to secure the nut in nonrotating relation to the workpiece, said body member including an imperforate deformable wall portion extending between said serration means and the threaded portion, means forming a cavity including a base in said body member bounded by said deformable wall portion and said cavity having an internal diameter greater than the diameter of said threaded portion, the external diameter of said body member in the portion thereof forming the deformable wall being proportioned to be received within a workpiece having an aperture therein of predetermined diameter, the deformable wall being spaced radially outwardly of said threaded portion by said base and forming an enlarged open end of said blind nut, said base extending radially inwardly between said deformable wall and said threaded portion and having a radial dimension between the deformable wall and the threaded portion greater than the cross-sectional dimension of the thickest portion of the wall portion between the serration means and the threaded portion, and said deformable wall between said serration means and said base being tapered and including a portion immediately adjacent said serration means which is thinner than the remaining portion of said wall and including a portion adjacent to saod base which is the thickest portion of said wall.

* * * * *